United States Patent
Itoh

(10) Patent No.: US 8,155,823 B2
(45) Date of Patent: Apr. 10, 2012

(54) VEHICLE MOUNTED FAILURE INFORMATION SYSTEM

(75) Inventor: Masaya Itoh, Kariya (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/407,976

(22) Filed: Mar. 20, 2009

(65) Prior Publication Data

US 2009/0248238 A1  Oct. 1, 2009

(30) Foreign Application Priority Data

Mar. 25, 2008  (JP) ................................. 2008-78684

(51) Int. Cl.
*G01M 17/00* (2006.01)
*G07C 5/00* (2006.01)

(52) U.S. Cl. ............... 701/31.7; 701/29.1; 701/31.4; 701/31.5; 701/32.5; 701/34.4

(58) Field of Classification Search ............... 701/29, 701/33
See application file for complete search history.

(56) References Cited

U.S. PATENT DOCUMENTS

| | | | | |
|---|---|---|---|---|
| 4,667,176 A * | 5/1987 | Matsuda | ................. | 340/459 |
| 4,969,099 A * | 11/1990 | Iwatsuki et al. | ................. | 701/62 |
| 5,291,803 A * | 3/1994 | Yamaguchi | ................. | 477/34 |
| 5,400,018 A * | 3/1995 | Scholl et al. | ................. | 340/10.3 |
| 5,481,906 A * | 1/1996 | Nagayoshi et al. | ........ | 73/114.61 |
| 5,598,141 A * | 1/1997 | Grasmann et al. | ........ | 340/426.27 |
| 5,697,048 A * | 12/1997 | Kimura | ................. | 725/75 |
| 5,809,437 A * | 9/1998 | Breed | ................. | 701/29 |
| 6,128,948 A * | 10/2000 | Shi et al. | ................. | 73/114.68 |
| 6,226,572 B1 * | 5/2001 | Tojima et al. | ................. | 701/23 |
| 6,666,199 B2 * | 12/2003 | Kato et al. | ................. | 123/688 |
| 6,917,865 B2 * | 7/2005 | Arai et al. | ................. | 701/30 |
| 7,471,999 B2 | 12/2008 | Taki | | |
| 2003/0214393 A1 * | 11/2003 | Nishiwaki et al. | ............ | 340/435 |
| 2003/0229402 A1 | 12/2003 | Junger et al. | | |

(Continued)

FOREIGN PATENT DOCUMENTS

CN  1522895 A  8/2004

(Continued)

OTHER PUBLICATIONS

Machine Translation of JP 2000-073842 A; Mar. 2000; Yukihiro, Ino.*

(Continued)

*Primary Examiner* — Darnell Jayne
*Assistant Examiner* — Sasha T Varghese
(74) *Attorney, Agent, or Firm* — Posz Law Group, PLC

(57) ABSTRACT

A failure information system that transmits various kinds of failure information of a vehicle to an outside diagnosis service center is disclosed. The failure information system includes a signal receiving unit that receives a signal indicating a failure of a vehicle-mounted system, a vehicle-run judging unit that judges that the vehicle is running, a run-distance calculation unit that calculates a run-distance of the vehicle since the signal indicating a failure is received, a reliability judging unit that judges that the signal indicating a failure is reliable if the signal receiving unit continuously receives the signal indicating a failure until the run-distance exceeds a preset distance level, and an over-vehicle communication unit that transmits the failure information that includes the signal indicating a failure when the reliability judging means judges that the signal indicating a failure is reliable.

12 Claims, 2 Drawing Sheets

U.S. PATENT DOCUMENTS

| | | |
|---|---|---|
| 2005/0021200 A1* | 1/2005 | Taki .............................. 701/33 |
| 2005/0149242 A1 | 7/2005 | Pavlish |
| 2009/0228170 A1 | 9/2009 | Taki |

FOREIGN PATENT DOCUMENTS

| | | |
|---|---|---|
| JP | A-06-247233 | 9/1994 |
| JP | A-07-150972 | 6/1995 |
| JP | A-10-246316 | 9/1998 |
| JP | A-2000-073842 | 3/2000 |
| JP | A-2001-287626 | 10/2001 |
| JP | A-2001-296915 | 10/2001 |
| JP | A-2002-109690 | 4/2002 |
| JP | A-2002-235599 | 8/2002 |
| JP | A-2003-239797 | 8/2003 |
| JP | A-2004-251336 | 9/2004 |
| JP | A-2005-219717 | 8/2005 |
| JP | A-2008-37194 | 2/2008 |
| JP | A-2008-044442 | 2/2008 |
| WO | WO 2008/062266 A1 | 5/2008 |

OTHER PUBLICATIONS

Machine Translation of JP 2002-235599 A; Aug. 2002; Masatoshi, Shibuya.*

Office Action mailed Jan. 19, 2010 issued from the Japan Patent Office in the corresponding patent application No. 2008-078684 (and English translation).

First Office Action issued from the Chinese Patent Office on Aug. 11, 2010 in the corresponding Chinese patent application No. 200910128967.7 (with English translation).

* cited by examiner

VEHICLE MOUNTED FAILURE INFORMATION SYSTEM

CROSS REFERENCE TO RELATED APPLICATION

The present application is based on and claims priority from Japanese Patent Application 2008-78684, filed Mar. 25, 2008, the contents of which are incorporated herein by reference.

BACKGROUND OF THE INVENTION

1. Field of the Invention

The present invention relates to a failure information system mounted in a vehicle for detecting failure of various vehicle-mounted electronic devices and systems and transmitting failure information to an outside diagnosis center.

2. Description of the Related Art

JP-A-2002-109690 discloses such a failure information system for detecting failure of vehicle mounted devices and systems. However, the disclosed failure information system has a possibility of sending failure information to an outside service center even when the vehicle is under repair or inspection in a car dealer or a garage, because the disclosed device cannot distinguish between failure and repair or inspection.

SUMMARY OF THE INVENTION

Therefore, an object of the invention is to provide an improved vehicle mounted failure information device for transmitting more reliable failure information to an outside service center.

According to a feature of the invention, a failure information system includes signal receiving means for receiving a signal indicating a failure of a vehicle-mounted system, vehicle-run judging means for judging that the vehicle is running, run-distance calculation means for calculating a run-distance of the vehicle since the signal indicating a failure is received, reliability judging means for judging that the signal indicating a failure is reliable if the signal receiving means continuously receives the signal indicating a failure until the run-distance becomes a preset distance level, and over-vehicle communication means for transmitting failure information that includes the signal indicating a failure to an outside station when the reliability judging means judges that the signal indicating a failure is reliable.

Because the failure information is transmitted to an outside station, such as a diagnosis center only when the reliability of the signal indicating a failure is high, the outside station can adequately instruct or guide a driver of the vehicle how to cope with the failure.

In the above information system: the vehicle-run judging means may include means for detecting an engine rotation speed, such as a tachometer, to judge that the vehicle is running; the run-distance calculation means preferably starts calculating the run-distance as soon as the vehicle-run judging means judges that the vehicle is running; the run-distance calculating means may be constructed of an odometer or a vehicle speedometer.

Another object of the invention is to provide a vehicle mounted device that can distinguish between failure and repair or inspection.

According to another feature of the invention, a failure information system includes signal receiving means for receiving a signal indicating a failure of a vehicle-mounted system, maintenance-service detecting means for detecting that the vehicle takes a maintenance service, reliability judging means for judging that the signal indicating a failure is reliable when the signal receiving means receives the signal indicating a failure and when the maintenance-service detecting means does not detect that the vehicle takes the maintenance service, and an over-vehicle communication unit for transmitting a failure information that includes the signal indicating a failure when the reliability judging means judges that the signal indicating a failure is reliable.

In this failure information system, the maintenance service detecting means may be means for detecting a maintenance key used for the maintenance service or a maintenance switch being turned on.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle mounted failure information system is mainly set in a navigation system 20 and will be described later.

Figure 1:
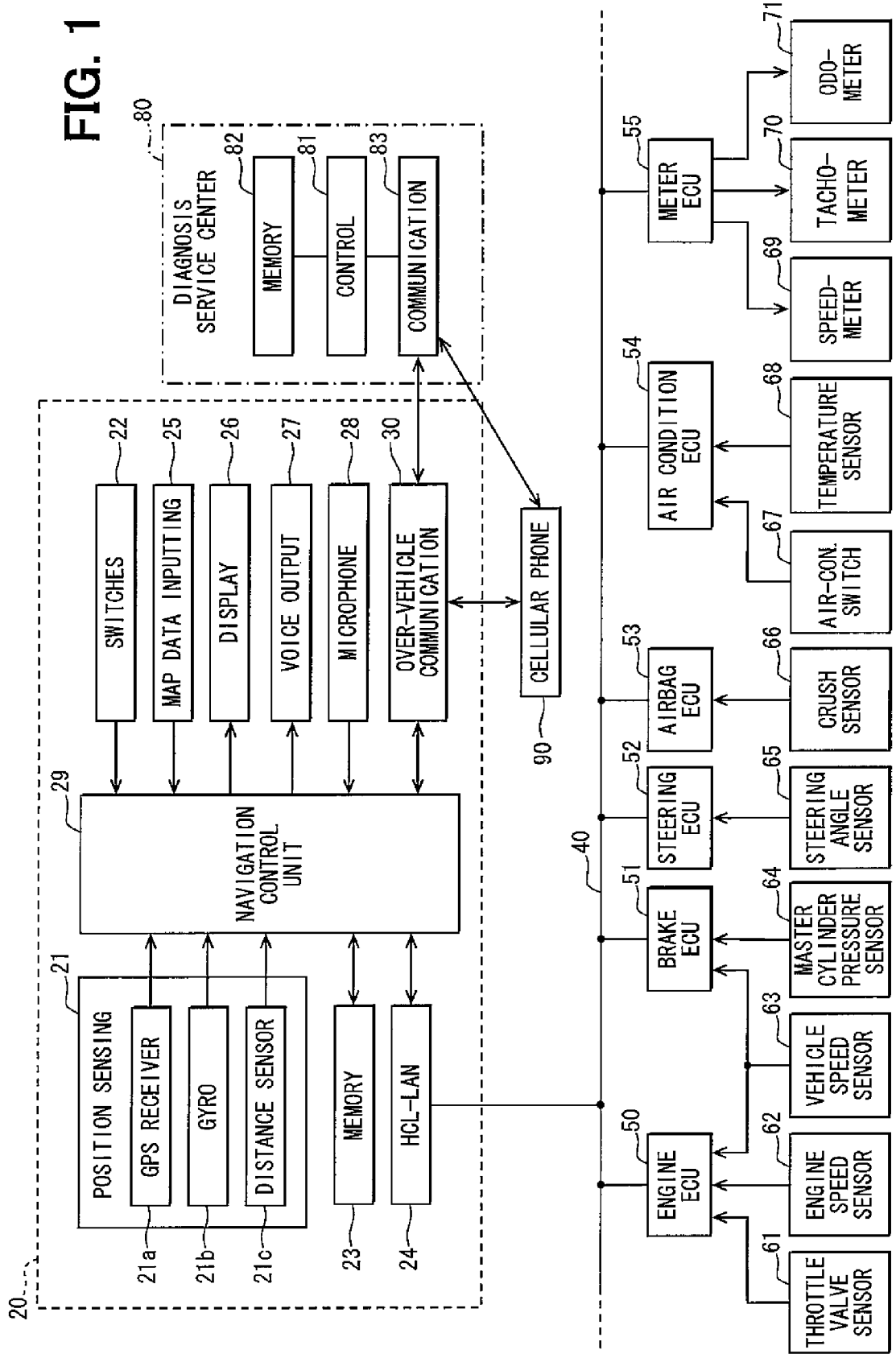
FIG. 1 is a block diagram showing an overall system that includes a vehicle mounted failure information device, various vehicle-mounted electronic devices and systems and a diagnosis service center.

As shown in FIG. 1, various electronic devices and systems are mounted in a vehicle. There are the navigation system 20, an engine control system that includes the engine ECU 50, a brake control system that includes a brake control system 51, a steering control system that includes a steering ECU 52, an air bag system that includes an air bag ECU 53, an air condition system that includes an air conditioning ECU 54, a meter system that includes a meter ECU 55. The ECUs 50-55 control respective systems according to signals from various sensors and switches. For example: the engine ECU 50 controls an engine according to signals from a throttle valve sensor 61, an engine speed sensor 62, a vehicle speed sensor 63; the brake control ECU 51 controls a brake system according to the signals from the vehicle speed sensor 63 and a master cylinder pressure sensor 64; the steering ECU 52 controls the steering control system according to a signal from a steering angle sensor 65; the air bag ECU 53 controls the air bag control system according to a signal from a crush sensor 66; the air conditioning ECU 54 controls the air condition system according to signals from an air conditioner switch 67 and a temperature sensor 68, and the meter ECU 55 connects with a speedometer 69, tachometer 70 and odometer 71.

The navigation system 20 includes a position sensing unit 21, a switch unit 22 of various switches, a memory unit 23, the above-stated vehicle LAN system 24, a map data inputting unit 25, a display unit 26, a voice outputting unit 27, a microphone 28, the navigation control unit 29 and an over-vehicle communication unit 30. The over-vehicle communication unit 30 communicates with an outside diagnosis service center 80, which includes a control unit 81, a memory 82 and a communication unit 83.

The position sensing unit 21 includes a global positioning system (GPS) receiver 21*a*, a gyroscope 21*b* and a distance sensor 21*c*. The distance sensor 21*c* may include an acceleration sensor for sensing vehicle acceleration, based on which the vehicle running distance is calculated. The navigation control unit 29 calculates the vehicle position, the running direction, the vehicle speed, etc. based on the signals from the GPS receiver 21*a*, the gyroscope 21*b* and the distance sensor 21*c*.

The switch unit 22 includes switches provided on a touch panel, manual switches disposed around the display unit 26, a key switch, etc. Incidentally, the touch panel is integrated with the display unit 26.

The memory unit 23 is constructed of a memory that needs not memory holding function, such as a flash memory or a hard desk.

The map data inputting unit 25 is a device for inputting map data, which include node data, link data, cost data, background data, road data, name data, mark data, crossroad data, institution data, etc., stored in a storage medium such as a hard desk or a DVD-ROM, into the navigation control unit 29. The storage medium stores the map data, voice guidance data and voice recognition data, etc. The above data can be inputted to the navigation control unit 29 from outside via a communication network instead of the data medium.

The display unit 26 is a liquid crystal display or an organic electro luminescence (EL) display that can superimpose vehicle position, a mark indicating the vehicle position, a guiding line on an optimum course to a destination, names of institutions, land marks, etc. on a map that is displayed. The display unit 26 may also display information on the institutions.

The microphone 28 inputs voice signals to the navigation control unit 29 to control the navigation system 20.

The navigation control unit 29 is a microcomputer that includes a CPU, a ROM, a RAM, a flash memory, I/O devices, a bus line, etc. The navigation control unit 29 calculates the vehicle position based on the signal sent from the position sensing unit 21 and from the map data inputted by the map data inputting unit 25, an optimum course to a destination based on the switching operation of the switch unit 22 and carries out navigation by displaying the optimum course and voice guidance.

The vehicle-mounted failure information system according a preferred embodiment of the invention is mainly set in the vehicle navigation system 20. That is, the vehicle mounted failure information system includes a signal receiving unit represented by vehicle LAN system 24 for receiving a failure signal when one of vehicle-mounted electronic devices or systems such as an engine ECU 50 fails, a vehicle-run judging unit represented by navigation control unit 29 for judging whether a vehicle is running or not, a vehicle-run-distance calculation unit represented by navigation control unit 29 for calculating a running distance during which the signal receiving unit 24 receives the failure signal, a run-distance judging unit represented by the navigation control unit 29 for judging reliability of the failure signal to be high if the running distance exceeds a predetermined running distance, and an over-vehicle transmitting unit 30 that sends the failure signal to the outside diagnosis center 80.

The ECUs 50, 51, 52, 53, 54 and 55 of the engine control system, brake control system, steering control system, air bag system, air condition system and meter system are interconnected with each other via a vehicle LAN 40. Each of the ECUs 50, 51, 52, 53, 54 and 55 has a program for failure diagnosing and provides a failure signal or code that indicates classified failure information when it fails. The failure signal is sent to the vehicle LAN 40 at a prescribed cycle.

The diagnosis service center 80 includes a diagnosis control unit 81, a failure information memory 82 that stores a diagnosis program and a diagnosis communication unit 83.

The diagnosis communication unit 83 receives failure information from the over-vehicle communication unit 30 of the navigation system 20. The failure information includes the failure signal and vehicle information, such as a vehicle license number, and time information such as time at which failure occurs. The diagnosis control unit 81 makes the failure information memory 82 memorize the failure information and carries out diagnosis according to the diagnosis program stored therein. The diagnosis control unit 81 also provides, via the diagnosis communication unit 83, the navigation system 20 with information to cope with the failure and service information on car dealers, garages, etc., such as addresses, telephone numbers and/or maps. The navigation system 20 displays the service information provided by the diagnosis service center 80 on the display unit 26 and transmits the service information to a cellular phone 90 of a vehicle user. On the other hand, the diagnosis communication unit 83 may directly transmit the service information to the cellular phone 90.

Figure 2:
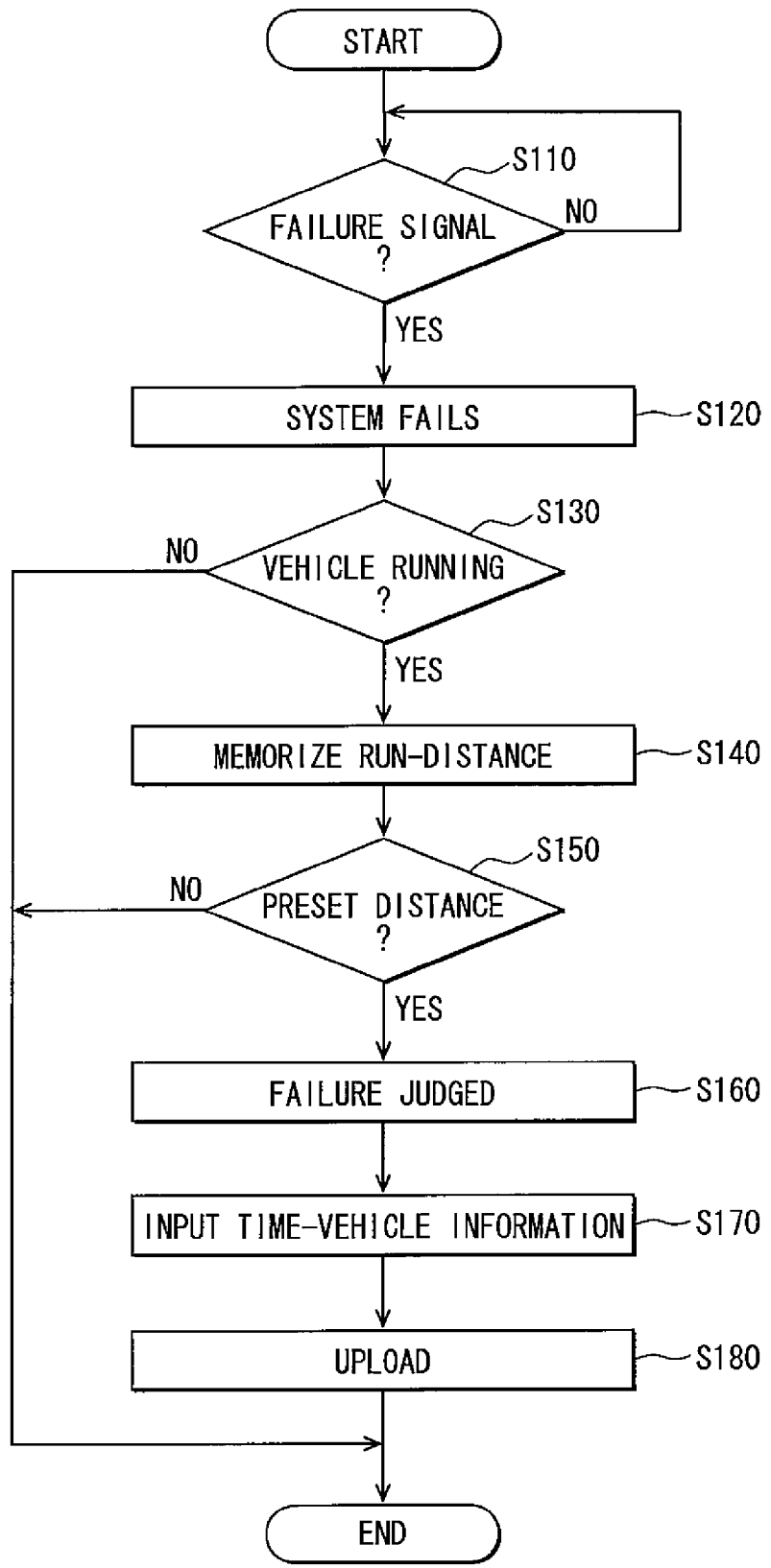
FIG. 2 is a flow diagram showing steps of failure detection and failure information transmission that are carried out by the vehicle mounted failure information device.

The failure detecting operation of the navigation control unit 29 of the navigation system 20 will be described with reference to a flow diagram shown in FIG. 2.

When the navigation system 20 is started, whether or not the vehicle LAN communication unit 24 receives the failure signal from one of the ECUs 50, 51, 52, 53, 54 and 55 via the vehicle LAN 40 is examined at a step S110. If the result is NO, the step S110 is repeated. If the result is YES, it is judged at S120 that the one of the systems including the ECUs 50, 51, 52, 53, 54 and 55 may have failed.

Subsequently, whether the vehicle is running or not is examined at S130. At this step, it is judged that the vehicle is running if an engine rotation speed is higher than a preset speed. Incidentally, whether the vehicle is running or not can be detected by the engine speed sensor 62 or the tachometer 70.

If the result of this examination is NO, the failure detecting operation ends, because the possibility of the failure is not so high and reliability of the failure signal is low while the vehicle is not running. On the other hand, data of total running distance is continuously inputted to the navigation control unit 29 to be memorized by a memory thereof from the ECU 55 of the meter system at S140 if the result is YES.

Thereafter, the running distance of the vehicle since the first failure signal is received is calculated, and whether the running distance is longer than a preset distance (e.g. 5 km) is examined at S150. Incidentally, the running distance can be detected by the odometer 71 or calculated based on the running speed detected by the vehicle speed sensor 63 and the running time since the first failure signal is received.

If the result is NO, the program ends as it is judged that the possibility of the failure is not so high and the reliability of the failure signal is low when the vehicle has not run the preset distance. On the other hand, it is judged that there is a failure at one of the systems that includes one of the ECUs 50, 51, 52, 53, 54 and 55 at S160, if the result is YES.

Then, the time information and the vehicle information are inputted to the navigation control unit 29 at S170 to be transmitted or uploaded to the diagnosis service center 80 via the over-vehicle communication unit 30 at S180. Incidentally, the vehicle information may include a vehicle registration number, vehicle position, a vehicle speed, attitude of the vehicle, a steering angle, information on operation of a brake system, information on operation of an accelerator, information on operation of an air conditioning system and/or information on operation of an audio device.

Thereafter, the operation ends. Thus, the reliability of the failure information can be improved and unnecessary information such as repair information or inspection information can be excluded from the failure information. Incidentally, the reliability of the failure information can be also ensured when it is detected that a maintenance key is not inserted into the key cylinder of the vehicle or a maintenance switch, which is included in the switch unit 22, is not turned on.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A failure information system for transmitting failure information of a vehicle to an outside diagnosis center comprising:
    signal receiving means for receiving a signal indicating a failure of a vehicle-mounted system;
    vehicle-run judging means for judging that the vehicle is running;
    run-distance calculation means for:
        calculating a run-distance of the vehicle since the signal receiving means received the signal indicating a failure in response to a judgment of the vehicle-run judging means that the vehicle is running at a time point when the signal receiving means receives the signal indicating a failure, and
        not calculating the run-distance of the vehicle in response to the judgment of the vehicle-run judging means that the vehicle is not running at a time point when the signal receiving means receives the signal indicating a failure, on the basis of a judgment that the signal indicating a failure is not reliable;
    reliability judging means for judging that the signal indicating a failure is reliable instead of not reliable, if the signal receiving means continuously receives the signal indicating a failure until the run-distance exceeds a preset distance level; and
    over-vehicle communication means for transmitting failure information that includes the signal indicating a failure to an outside station when the reliability judging means judges that the signal indicating a failure is reliable.

2. A failure information system as claimed in claim 1, wherein the vehicle-run judging means judges that:
    the vehicle is running when an engine rotation speed of the vehicle detected by an engine speed sensor is higher than or equal to a preset speed; and
    the vehicle is not running when the engine rotation speed is less than the preset speed.

3. A failure information system as claimed in claim 1, wherein the vehicle-run judging means judges that:
    the vehicle is running when an engine rotation speed of the vehicle indicated on a tachometer is higher than or equal to a preset speed; and
    the vehicle is not running when the engine rotation speed indicated on the tachometer is less than the preset speed.

4. A failure information system as claimed in claim 1, wherein the run-distance calculation means starts calculating the run-distance when the vehicle-run judging means judges that the vehicle is running based on detection of a total running distance of the vehicle indicated on an odometer.

5. A failure information system as claimed in claim 1, wherein the run-distance calculating means starts calculating the run-distance when the vehicle-run judging means judges that the vehicle is running based on a vehicle speed of the vehicle detected by a vehicle speed sensor and a time elapsed after of the vehicle-run judging means judges that the vehicle is running.

6. A failure information system as claimed in claim 1, further comprising:
    maintenance-service detecting means for detecting that the vehicle is undergoing a maintenance service, wherein
    the reliability judging means that the signal indicating a failure is reliable when the signal receiving means receives the signal indicating a failure and when the maintenance-service detecting means does not detect that the vehicle is undergoing the maintenance service.

7. A failure information system as claimed in claim 6, wherein the maintenance service detecting means comprises means for detecting a maintenance key used for the maintenance service.

8. A failure information system as claimed in claim 6, wherein the maintenance service detecting means comprises means for detecting a maintenance switch being turned on.

9. A failure information system as claimed in claim 1, wherein the failure information includes a time at which the signal receiving means receives the signal indicating a failure.

10. A failure information system as claimed in claim 9, wherein the failure information further includes a vehicle license number.

11. A failure information system as claimed in claim 1, further comprising: time information acquisition means for acquiring time information indicating a time, wherein the over-vehicle communication means transmits the time information acquired by the time information acquisition means with the failure information to the outside diagnosis center when the reliability judging means judges that the signal indicating a failure is reliable.

12. A failure information system as claimed in claim 1, further comprising:
    vehicle information acquisition means for acquiring vehicle information about the vehicle, wherein the over-vehicle communication means transmits the vehicle information acquired by the vehicle information acquisition means with the failure information to the outside diagnosis center when the reliability judging means judges that the signal indicating a failure is reliable.

* * * * *